Patented Jan. 12, 1954

2,666,078

UNITED STATES PATENT OFFICE 2,666,078

BIS-TRICHLOROETHYL BENZENE PHOSPHONATE

Clarence N. Ferguson, Chicago, Ill., assignor to Arvey Corporation, a corporation of Illinois No Drawing. Application May 16, 1952,
Serial No. 288,299

1 Claim. (Cl. 260—461)

This invention relates to the production of a new composition of matter. More specifically, this invention relates to the production of a new composition of matter having the structural formula

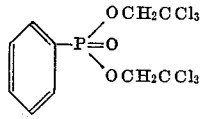

which is herein termed bis-trichloroethyl-benzene phosphonate.

Broadly the above compound may be prepared by the reaction of benzene phosphorus oxydichloride and β-trichloro-ethanol in relatively inert solvent at a temperature between about 20° C. and the decomposition point of the reactants and products; and subsequent isolation of the product.

The relatively recent development of organic insecticides having residual characteristics provided many advantages not previously enjoyed. It is possible after one treatment with a residual insecticide to attain a degree of protection adequate for a period of several months or more. This of course provides economical control of harmful insect pests and even allows preventive control prior to an infestation. Insect toxicants, being lethal to insects, are also generally harmful to warm-blooded animals. This being the case, when treating edible crops, it is desirable, if not necessary to insure that insecticide residues be not harmful at the time such crop is consumed. This can be achieved by insuring that the residue is either non-toxic or of such low concentration as to be harmless.

It is desirable, therefore, in the treatment of food crops to utilize an insecticide which, under weathering conditions such as moisture and sunlight, will be converted to innocuous substances. Such conversion should be of such rate as to allow adequate protection for a required period after which time the crop is safe for consumption.

The product of the present invention has the desirable attributes stated above. That is, it will hydrolyze slowly after application thereby insuring a safe crop at the time of consumption. It is, therefore, an object of the present invention to produce insecticidal material which hydrolyze upon exposure to the elements thereby insuring lack of harmful residues at harvest time.

The above described compound may be prepared in accordance with the following example.

Example I

Into a one-liter, three-necked flask equipped with a reflux condenser, stirrer, and thermometer were placed 0.933 mole (182 g.) of benzene phosphorus oxydichloride, 2 moles (297 g.) of β-trichloro-ethanol, and 300 ml. of ether. The reaction mixture was refluxed with stirring for about two and one-half hours. (The end point of the reaction is reached when no further HCl is given off through the reflux condenser.) When the reaction was complete, the solvent either was removed by distillation and the product removed as a residue. The residue was purified by recrystallization from diethyl ether. The purified product melted at 83–84° C. The elementary analysis was:

|  | P | Cl |
| --- | --- | --- |
| Calculated for $C_{10}H_9OCl_6P$ | 7.37 | 50.5 |
| Analysis of Purified Product | 7.40 | 50.4 |

The method of manufacture of the above phosphorus compound is not critical, but may be modified in a number of ways. The reaction may be run at temperatures from about normal room temperature to about 120° C. A preferred range of temperatures is from about 50° C. to about 90° C.

The reaction may be run in a solvent such as ether, dioxane, or an excess of one reactant such as the β-trichloro-ethanol. A tertiary amine such as pyridine may be added in small amounts to react with generated HCl. (With the use of an amine, the HCl by-product is removed from the reaction mixture as an amine hydrochloride.) The reaction may also be run in the absence of solvent.

Pressure is not critical, and the above discussed reaction may be run at atmospheric pressure in open vessels.

The reaction time should be sufficient to insure the complete utilization of the reactants. A preferred reaction period is between about two hours and about four hours when operating in the preferred temperature range.

The reactants should be utilized in stoichiometric amounts, which is a ratio of 1 mole of the acid chloride to two moles of the alcohol. Such a ratio is, however, not critical, and may be varied at will.

The compound, bis-trichloroethyl-benzene-phosphonate, the preparation of which is given above, has the characteristics of an excellent insecticide and fungicide. The following table will illustrate the usefulness of the present compound against insects.

| Insect | Dosage | Percent mortality in 48 hours |
|---|---|---|
| Mexican Bean Beetle | 1 lb./100 gals | 90 |
| Southern Army Worm | 1 lb./100 gals | 90 |

The present compound is also useful as a fire-retardant impregnant for such flammables as paper, wood, fabrics, etc. The material is also useful as a fire-retardant plasticizer in resins.

The phosphorus compound may be applied to insect infestations in the form of an aqueous emulsion, a dust, a solvent spray, a fog, or as poisoned baits. In general, any known means for formulating and applying pesticides can be utilized for the product of my invention.

I claim as my invention:

As a new composition of matter

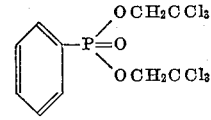

CLARENCE N. FERGUSON.

No references cited.